Figure 6:
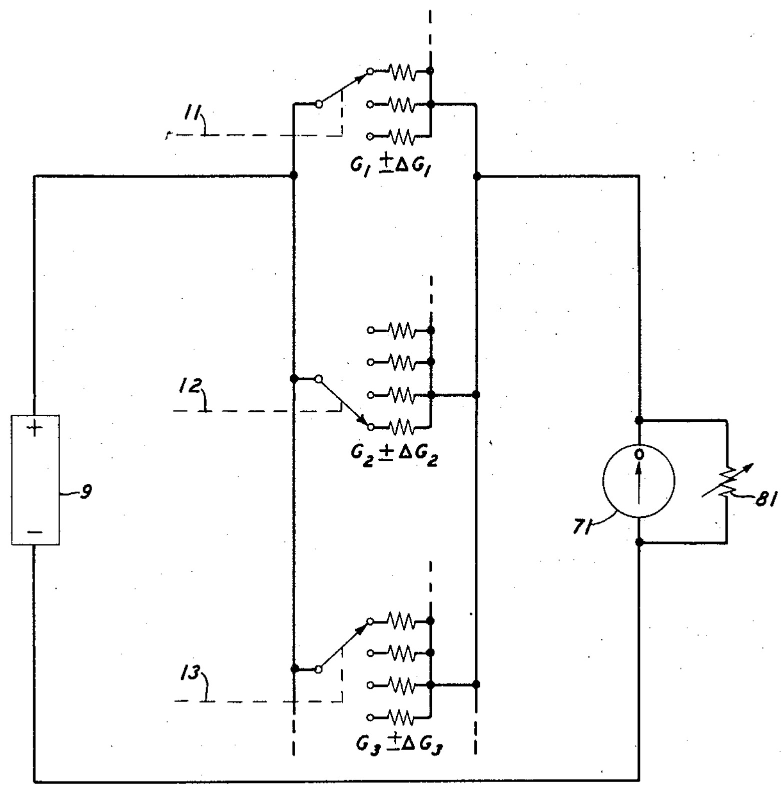

Aug. 30, 1960 G. F. CRITCHLOW 2,951,200
CALIBRATION INDICATOR
Filed Oct. 29, 1954 3 Sheets-Sheet 1
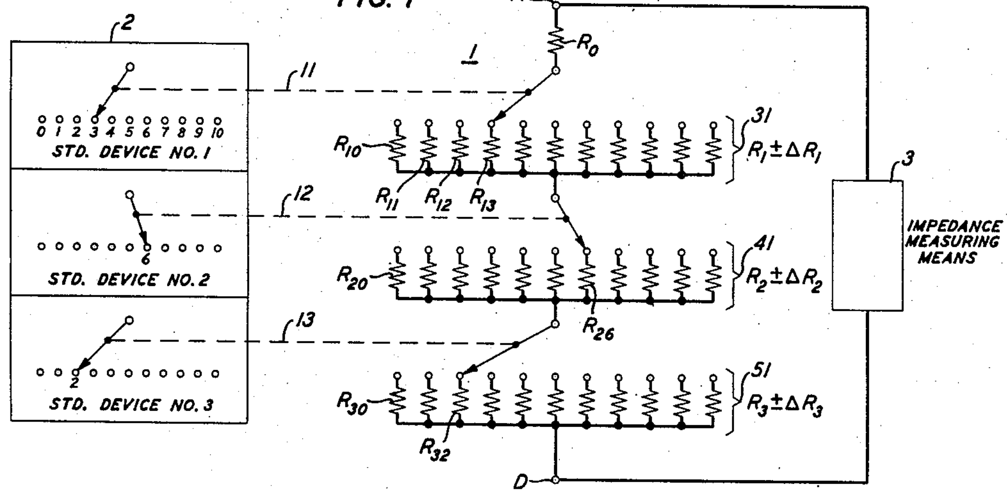
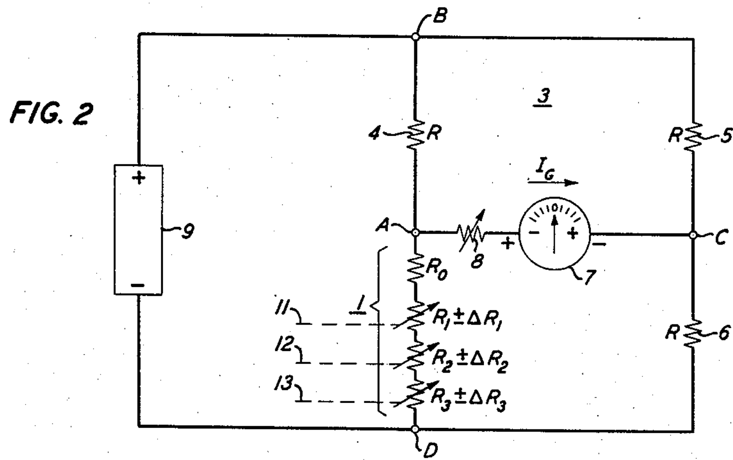
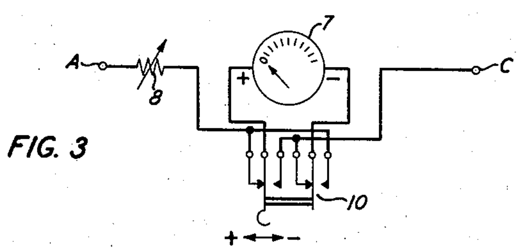
INVENTOR
G. F. CRITCHLOW
BY
Walter M. Hill
ATTORNEY Aug. 30, 1960
G. F. CRITCHLOW
2,951,200
CALIBRATION INDICATOR
Filed Oct. 29, 1954
3 Sheets-Sheet 2
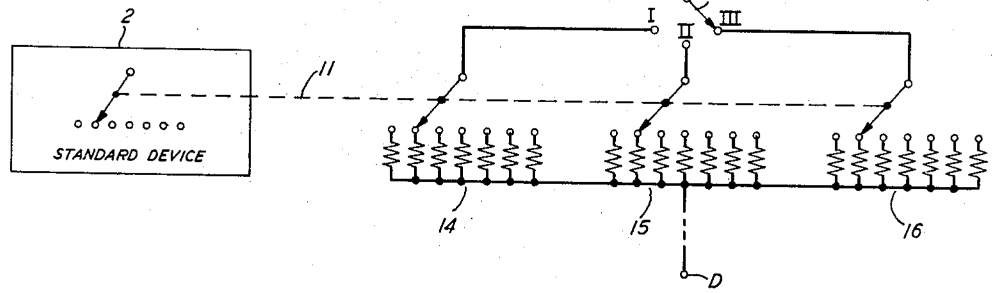
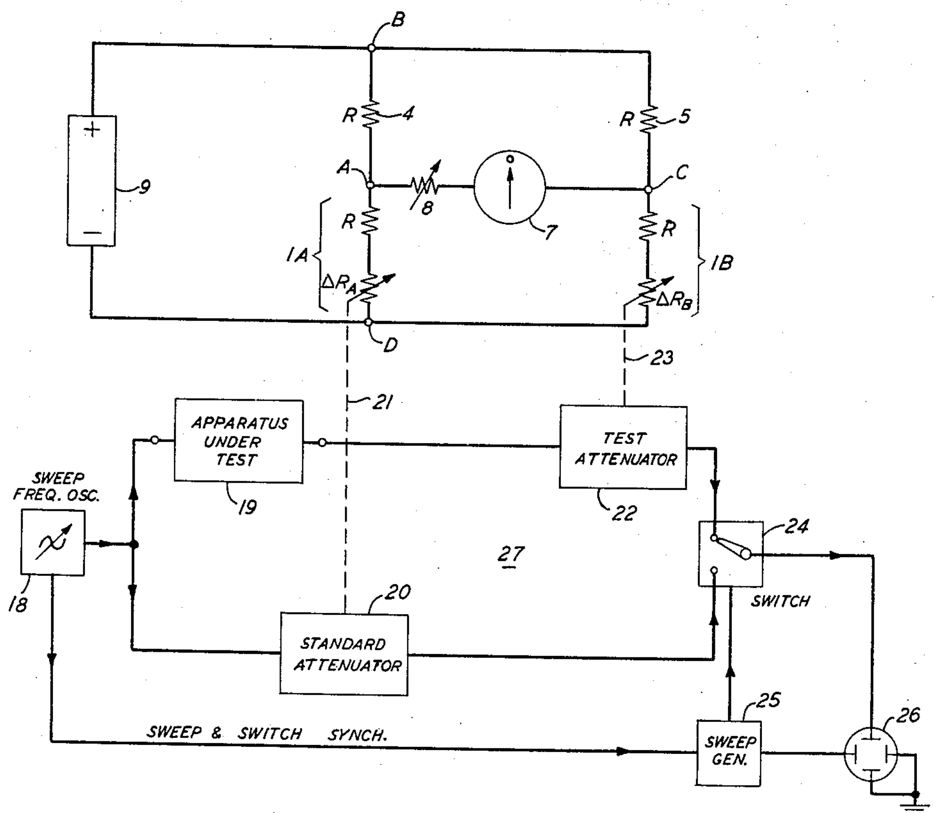
INVENTOR
G. F. CRITCHLOW
BY Walter M. Hill
ATTORNEY INVENTOR
G. F. CRITCHLOW
BY
Walter M. Hill
ATTORNEY United States Patent Office 2,951,200 Patented Aug. 30, 1960

2,951,200

CALIBRATION INDICATOR

George F. Critchlow, Morristown, N.J., assignor to Bell Telephone Laboratories, Incorporated, New York, N.Y., a corporation of New York Filed Oct. 29, 1954, Ser. No. 465,598

5 Claims. (Cl. 324—57)

This invention relates to the art of precision measurement and more particularly to an automatic calibration indicator for automatically indicating the total correction required of a plurality of standard elements.

In the art of electrical measurements involving the use of precision standards, calibration corrections are needed to convert the nominal or indicated value to the true value, frequently referred to as the "best known" value. As most commonly used in bridge and attenuator circuits, the electrical standards are usually in the form of decades having several switch controlled decade dials. The nominal value of the standards for any combination of dial settings is the sum of the individual decade settings. The true value is obtained by corrections applied in the form of additive corrections. The usual practice is to have the calibration corrections for each dial setting tabulated. The correction for each dial setting is looked up and algebraically added to the total reading. For occasional use, calibration tables are not too clumsy and the time consumed in their use is not considered objectionable. However, for production or laboratory testing where a considerable number of readings have to be corrected, the use of such calibration tables is both time consuming and subject to accidental errors. For this reason, some means of automatically indicating the total calibration is desired.

It is the object of this invention to provide an automatic means for directly indicating the algebraic sum of the several corrections required, thereby both reducing the accidental errors and increasing the speed of measurement.

The foregoing object is attained by this invention which provides a circuit containing an impedance (or admittance) for each standard element of the main measuring structure. The magnitude and algebraic sign of each impedance is determined by the amount and sign of the correction required for its associated standard element. These impedances are switched into a correction indicating circuit by means of a mechanical coupling to the controls for the standard elements. The selected impedances are combined in the indicating circuit and their algebraic sum determines the response of a suitable impedance responsive indicator. The indicator is calibrated to read the total correction in terms of the unit to which the standard elements are calibrated.

The invention may be better understood by referring to the accompanying drawings in which:

Fig. 1 shows an embodiment of the invention in which the impedance elements are connected in series;

Fig. 2 discloses a preferred form of correction indicating circuit which may be used with the apparatus of Fig. 1;

Fig. 3 discloses an alternate form of meter circuit for Fig. 2;

Fig. 4 discloses an arrangement wherein a plurality of correction networks may be mechanically coupled to each standard unit, one for each different test condition requiring a different calibration correction;

Fig. 5 discloses another embodiment of the invention wherein the correction impedance elements are in adjacent arms of an electrical bridge so as to indicate the difference between the calibration corrections for two standard units; and Fig. 6 discloses a still further embodiment of the invention wherein the elements are connected as conductances in parallel rather than as series connected resistors.

Referring now to Fig. 1, it will be noted that a plurality of impedance elements are shown switched in series to form a network 1. As shown in this figure, three adjustable units 31, 41 and 51 are connected in series so that the selected impedances are additive. Each of the adjustable impedance units is mechanically coupled to an associated standard measuring device in the measuring structure 2. The sum of the impedances selected in network 1 is indicated by a suitable impedance measuring means 3. These impedances are preferably pure resistances but reactances of one kind or complex impedances of constant phase angle can also be used.

The first adjustable indicating unit is shown coupled to standard device No. 1 by means of a mechanical link 11. The other two adjustable units are similarly connected to their associated standard devices by means of mechanical links 12 and 13. The resistors $R_{10}$, $R_{11}$, $R_{12}$, $R_{13}$, etc. of the first unit may be selectively switched into the circuit and the resistance of each may be considered as equal to $R_1 \pm \Delta R_1$. The purpose of including the residual resistance $R_1$ in each of these elements is to enable one to take both positive and negative correction values into account. It is to be remembered that the algebraic correction value for each standard element determines the algebraic value of the corresponding impedance used in the correction unit. For example, as shown, resistor $R_{13}$ is switched into the first unit. Its resistance corresponds with the correction required for the third position of the first standard device. If it is assumed that the correction for this switch position has a negative value, then the value of $\Delta R_1$ is proportional to this correction and is considered negative so that the actual value of $R_{13}$ is less than the value $R_1$ by the amount $\Delta R_1$. Thus, it is seen that the value of $R_1$ to be uniformly used for all the elements of the first unit must have a magnitude equal to or greater than the maximum negative correction that must be made.

By way of further example, let it be assumed that the measuring unit 2 comprises three decades of a resistance bridge and that standard device No. 1 is the 100's decade. With the switch in position 3, this decade has a nominal value of 300 ohms. Let the correction required for this position be $-1$ ohm. Therefore, the actual resistance of this particular standard element is 299 ohms. Now, if it is arbitrarily assumed that resistance $R_1$ is 100 ohms and the value of $\Delta R_1$, corresponding to the correction of $-1$ ohm, is $-10$ ohms, the actual value of resistor $R_{13}$ would be $100-10$ or 90 ohms. If, on the other hand, the actual value of the 300-ohm resistor had been 302 ohms, the correction required would be $+2$ ohms and on the assumptions made above, the value of $\Delta R_1$ in this case would be $+20$ ohms, thereby requiring resistor $R_{13}$ to have a resistance of 120 ohms.

The actual values of resistors $R_{10}$, $R_{11}$, etc. are thus seen to be arbitrarily selectable parameters chosen to give variations proportional to the required corrections for their associated standard elements. Similarly, the resistances are chosen for the corrections to be made for the other two standard decades and it will be readily understood that the total series resistance between the terminals A and D will be determined by the algebraic sum of the corrections required for all three decades. The value of this total resistance is observed by the measuring means 3 which is calibrated to read the required correction directly in units of the standard elements of the devices 2.

The impedance measuring means 3 may be in the form of a simple ohmmeter with its indicator deflected to a point about midway of its total usable resistance range when the sum of the correction resistances $\Delta R_1$, $\Delta R_2$, etc. is equal to zero. A conventional ohmmeter would usually indicate the resistance between terminals A and D, but for the purposes of this invention, its scale is calibrated to read zero correction at this midpoint. In this way, the indicator could be made to show both positive and negative corrections.

A preferred form of indicator having a substantially linear scale is shown in Fig. 2. Here the network 1 of Fig. 1 is shown connected between the terminals A and D of a simple Wheatstone bridge 3. The other arms of this bridge 4, 5, and 6 may preferably contain equal resistors of resistance R. In order for the galvanometer 7 to read zero on its zero-center scale, the sum of the resistances $R_0$, $R_1$, $R_2$ and $R_3$ of the A—D arm is made equal to the resistance R. While the adjustable impedance units are shown as simple variable resistors, it will be understood that they are preferably in the form shown between the A and D terminals of Fig. 1. It will be further understood that they are coupled to three standard units by means of mechanical links 11, 12 and 13 as indicated in Fig. 1. The bridge is supplied from a source of voltage 9 which is connected between the B and D terminals of the bridge. If the various bridge parameters are properly proportioned, the galvanometer deflection may be made a substantially linear function of the sum of the resistances $\Delta R_1$, $\Delta R_2$ and $\Delta R_3$. This will be realized if the maximum value of the sum of these resistance increments is kept small compared with resistance R. The galvanometer 7 may be calibrated by injecting a known resistance increment in series with the A—D arm of the bridge. This resistance increment should correspond with a known correction for the standard unit 2. The variable series resistor 8 is then adjusted to cause the galvanometer 7 to indicate this known amount of correction.

Fig. 3 shows an alternative form of meter circuit for the bridge of Fig. 2. In Fig. 2 it was assumed that the galvanometer 7 was a zero-center type of instrument so that deflection in one direction would correspond to positive corrections and opposite deflections would correspond to negative corrections. In Fig. 3 it is assumed that the galvanometer is of the end-zero type. With the key 10 in its normal position, as indicated, the galvanometer would move up scale for positive corrections. If the sum of the correction increments is negative, the meter would show a negative off-scale deflection. By operating key 10 to the right, an up-scale deflection may be obtained. Reference is then made to the position of key 10 to determine the algebraic sign of the correction and to the galvanometer 7 for its magnitude.

Where the invention is used in connection with attenuators or decade structures for bridges that are to be powered by alternating current, it is usually necessary to provide different corrections for the different frequency levels at which the measurements are made. Other measuring conditions, as is well known, may also alter the magnitude of the corrections required for a given standard element. In Fig. 4, provision is made for three different test conditions. In this figure three separate adjustable units 14, 15 and 16 correspond with those associated with standard device No. 1 of Fig. 1. These may be selectively connected into the circuit by means of a selector switch 17. As shown, this switch has three positions I, II and III each corresponding to a different test condition. It is obvious that this may be extended to any number of decades as well as to any number of test conditions.

Fig. 5 shows the invention applied to the attenuators of a loss comparison transmission measuring set 27. In this case two networks such as network 1 of Fig. 1 may be employed. One of these, denoted network 1A, is shown in the A—D arm of the bridge while a similar network 1B is shown in the adjacent C—D arm of the bridge. The variable increments section of network 1A of resistance $\Delta R_A$ is coupled to a standard attenuator 20 by means of a mechanical link 21 while the corresponding part of network 1B having a resistance $\Delta R_B$ is coupled through link 23 to a test attenuator 22. It will be understood that each section of networks 1A and 1B will have its own mechanical control so that links 21 and 23 must be understood as symbolically representing a plurality of links such as links 11, 12 and 13 of Fig. 1.

The test apparatus 27 is of a conventional nature and will only be briefly described to illustrate this use of the invention. A sweep frequency oscillator 18 is connected to two transmission channels, the upper one of which contains the apparatus under test 19 and the test channel attenuator 22. The lower channel contains a standard attenuator 20. It will be understood that as the oscillator 18 sweeps through its frequency band its output is applied to both channels of the test circuit. During one sweep of the oscillator, a switch 24, which may be either electromechanical or electronic, connects the test channel to the vertical deflection electrodes of an oscilloscope 26. Simultaneously with the initiation of the sweep, a sweep generator 25 is started in operation through its synchronizing coupling to the sweep oscillator 18. The sweep generator 25 produces a substantially linear time base for the horizontal electrodes of oscilloscope 26. It will, therefore, be understood that during this sweep of oscillator 18 the transmission characteristic of the apparatus under test 19 will be displayed on the screen of oscilloscope 26. At the initiation of the next succeeding sweep of oscillator 18, a sweep and switch synchronization pulse is transmitted to the sweep generator 25 to again initiate the horizontal deflection of the beam in oscilloscope 26 and to simultaneously operate switch 24 to the lower channel thereby superimposing on the screen or oscilloscope 26 the transmission characteristic of the standard attenuator 20. The repetition of successive sweeps of oscillator 18 is of sufficiently high rate to cause the superimposed images to appear simultaneously on the screen of oscilloscope 26. Insofar as the present invention is concerned, it may be stated that the loss in the two channels will be the same for any particular frequency if at that frequency the two characteristic diagrams intersect. The transmission loss (or gain) of the apparatus under test may then be determined by the difference between the readings of the test attenuator 22 and the standard attenuator 20. Both of these attenuators are carefully calibrated and the corrections which must be applied for their steps determine the sizes of the impedance units in the variable elements of networks 1A and 1B. Since these networks are in adjacent arms of the bridge, the galvanometer 7 can be made to read their difference. In this case, instead of the galvanometer 7 being calibrated in terms of ohms as was the case in the previous example, the calibration is in terms of decibels since that is the unit to which the attenuators 20 and 22 are usually calibrated.

Fig. 6 discloses a modification in the arrangement of the adjustable elements of the indicator networks. Instead of connecting these units in series, as was done in the prior figures, they are connected as conductances in parallel. Any number of such units may be connected together depending on the number of standard devices requiring correction and these may be connected to the standard devices by means of mechanical links 11, 12 and 13 as before. Galvanometer 71 is calibrated with a zero-center scale but its pointer normally will be at rest at one end of the scale. When the sum of the incremental conductances $\Delta G_1$, $\Delta G_2$, $\Delta G_3$, etc. is zero, the sum of the conductances G1, G2, G3, etc. is sufficient to cause the galvanometer 71 to deflect to its zero calibration at the center of its scale. To insure that such deflection takes place, under the conditions assumed, the shunt 81 may be conveniently adjusted to bring this about.

While in each of the several figures described a direct-current source 9 has been disclosed, it will be evident to anyone skilled in the art that an alternating-current source could be used instead. In the case of the bridge networks, for example the network of Fig. 2, the positive and negative deflections of the galvanometer may be obtained by employing a well-known type of phase sensitive bridge detector. It should also be understood that although this invention is most adaptable for use with electrical standards it is not limited to such standards but could be extended to quantitative units of any kind. The invention is obviously adaptable for use with standard devices having any number of steps and is, therefore, not limited to use with standards arranged as decades. These and other modifications will be readily apparent to anyone skilled in the art and each and all of them are to be considered as equivalents within the scope of the invention. Where the term impedance is used in the appended claims, it is intended that the term also include such an element when used as an admittance element.

What is claimed is:

1. Means for automatically indicating the total correction for the standard elements in a plurality of adjustable standard devices, comprising a plurality of adjustable standard devices each having standard elements, an impedance in said means for each of said elements having a magnitude determined by the correction required of its associated standard element, a separate selective switching means connected to the group of impedances associated with each one of the standard devices, a mechanical means for coupling each switching means with its associated standard device so that each switching means may select the impedance associated with the standard element to which its standard device is adjusted, circuit means including the several switching means to combine the impedances thus selected into a single circuit, and an indicating means connected to said single circuit calibrated to read the total correction in terms of the unit to which said standard elements are calibrated.

2. The combination of claim 1 wherein the single circuit combined by said circuit means is a series circuit of said selected impedances, said indicating means comprises an electrical bridge having said series circuit included in an arm thereof, and an output circuit for said bridge including a current responsive indicator connected to said output circuit.

3. The combination of claim 1 wherein the single circuit combined by said circuit means is a parallel circuit of said selected impedances and said indicating means comprises a current responsive indicator connected in series with said single circuit.

4. Means for automatically indicating the algebraic difference between the total corrections for the standard elements of two sets of adjustable standards, each set comprising at least one adjustable standard device, an impedance in said means for each of the standard elements of the standard devices of each set having a magnitude determined by the correction required of its associated standard element, a separate selective switching means connected to the group of impedances associated with each one of the standard devices of each set, a mechanical means for coupling each switching means with its associated standard device so that each switching means may select the impedance associated with the standard element to which its standard device is adjusted, a first circuit means including the several switching means of one set to combine the selected impedances for that set into a single circuit, a second circuit means for similarly combining the selected impedances of the other set, an electrical bridge having four arms, two of which comprise impedances of predetermined value, the remaining two arms comprising respectively said first and second circuit means, an output circuit for said bridge, and an electrical indicator connected to said output circuit calibrated to read the algebraic difference between the two total corrections in terms of the unit of said standard elements.

5. The combination of claim 1 wherein said indicating means comprises a direct reading impedance meter calibrated to read the total correction in terms of the unit of said standard element.

References Cited in the file of this patent

UNITED STATES PATENTS

| | | |
|---|---|---|
| 2,108,146 | Simpson | Feb. 15, 1938 |
| 2,271,508 | Gordon | Jan. 27, 1942 |
| 2,430,488 | Wilhelm | Nov. 11, 1947 |

FOREIGN PATENTS

| | | |
|---|---|---|
| 625,023 | Great Britain | June 21, 1949 |